Nov. 4, 1952 — W. W. HAASE — 2,616,146
BURIAL VAULT FORM
Filed Nov. 4, 1949 — 9 Sheets-Sheet 1

Inventor:
Wilbert W. Haase
By: Wallace and Cannon
Attorneys

Nov. 4, 1952 — W. W. HAASE — 2,616,146
BURIAL VAULT FORM
Filed Nov. 4, 1949 — 9 Sheets-Sheet 2

Inventor:
Wilbert W. Haase
By: Wallace and Cannon
Attorneys

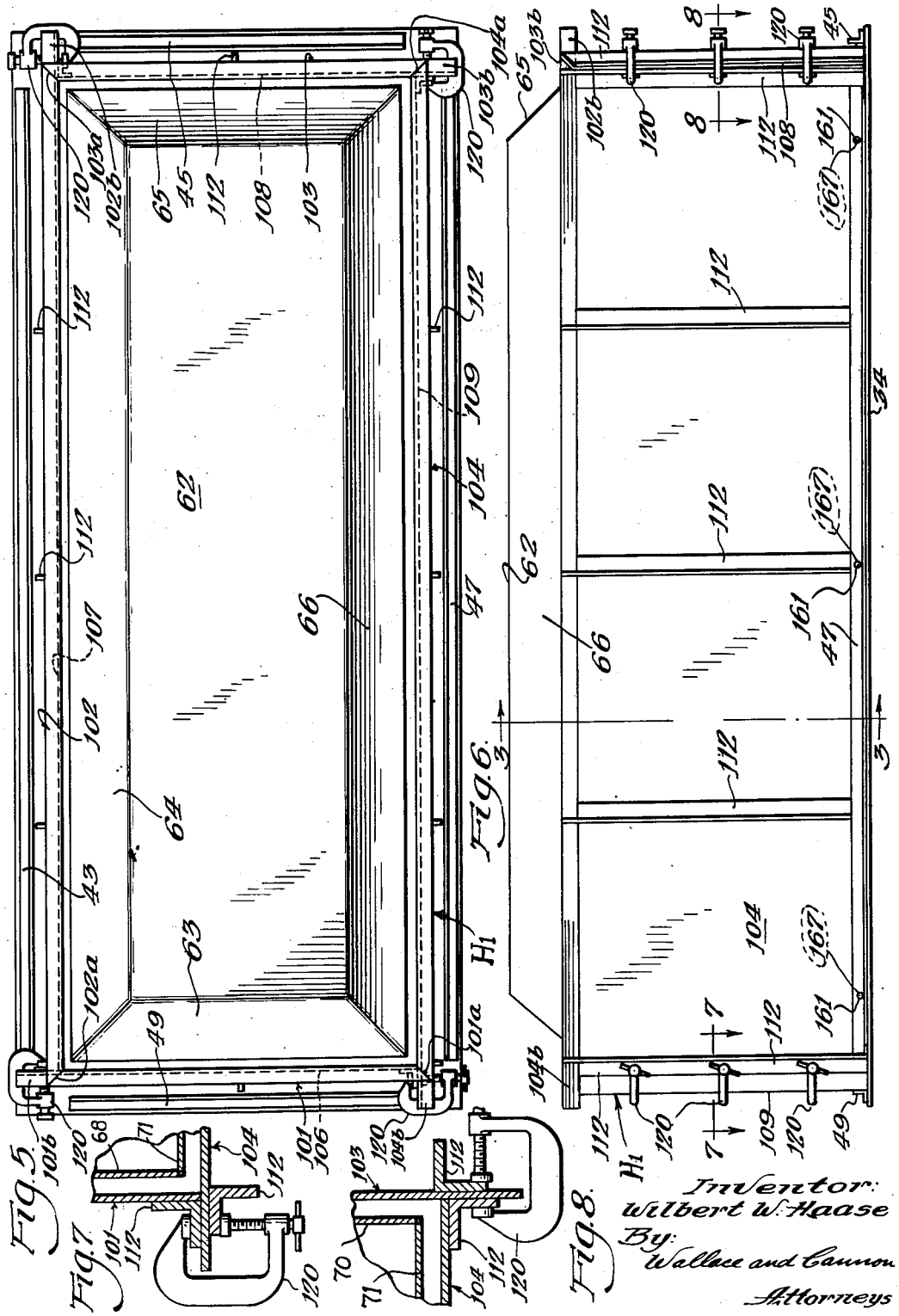

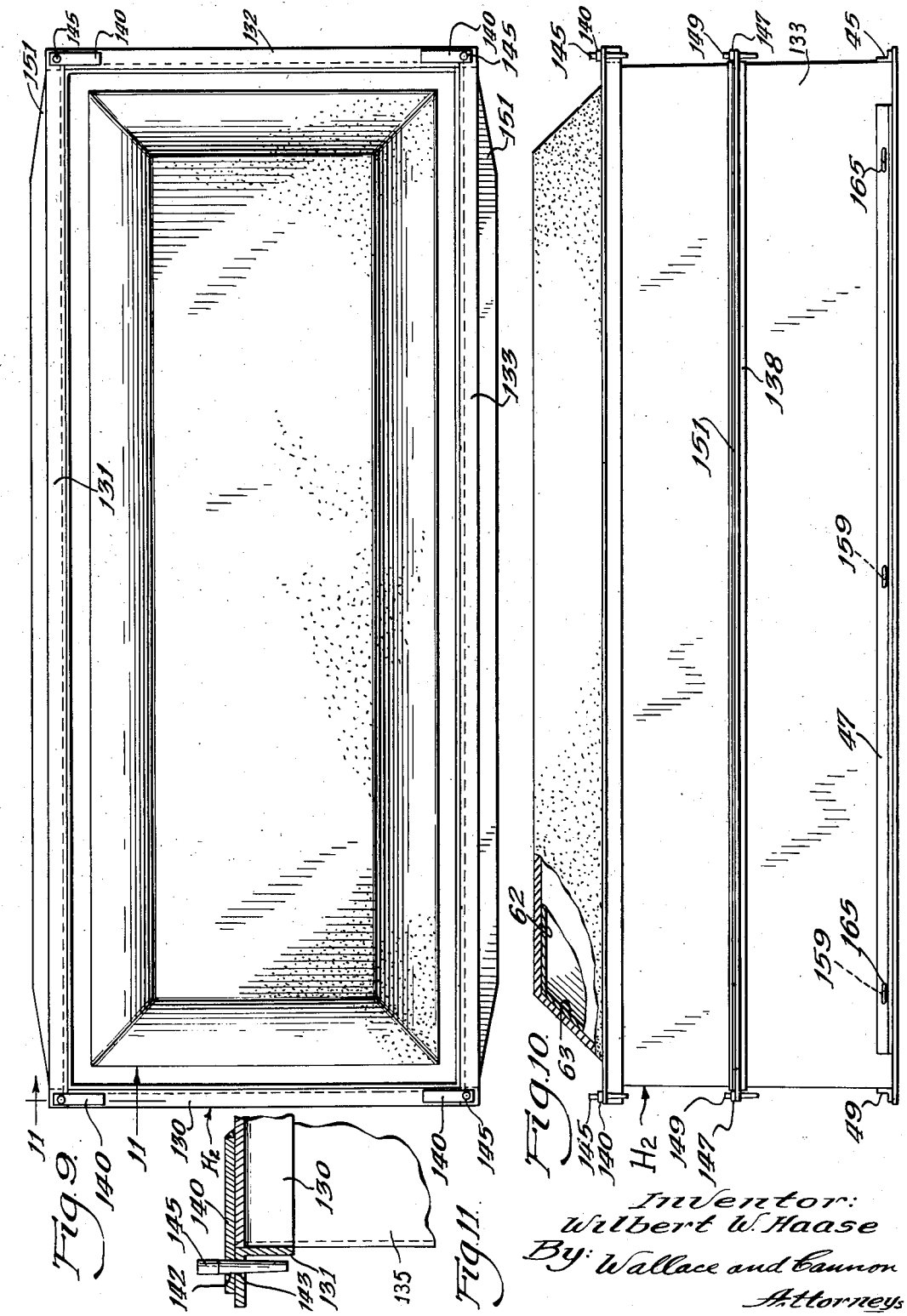

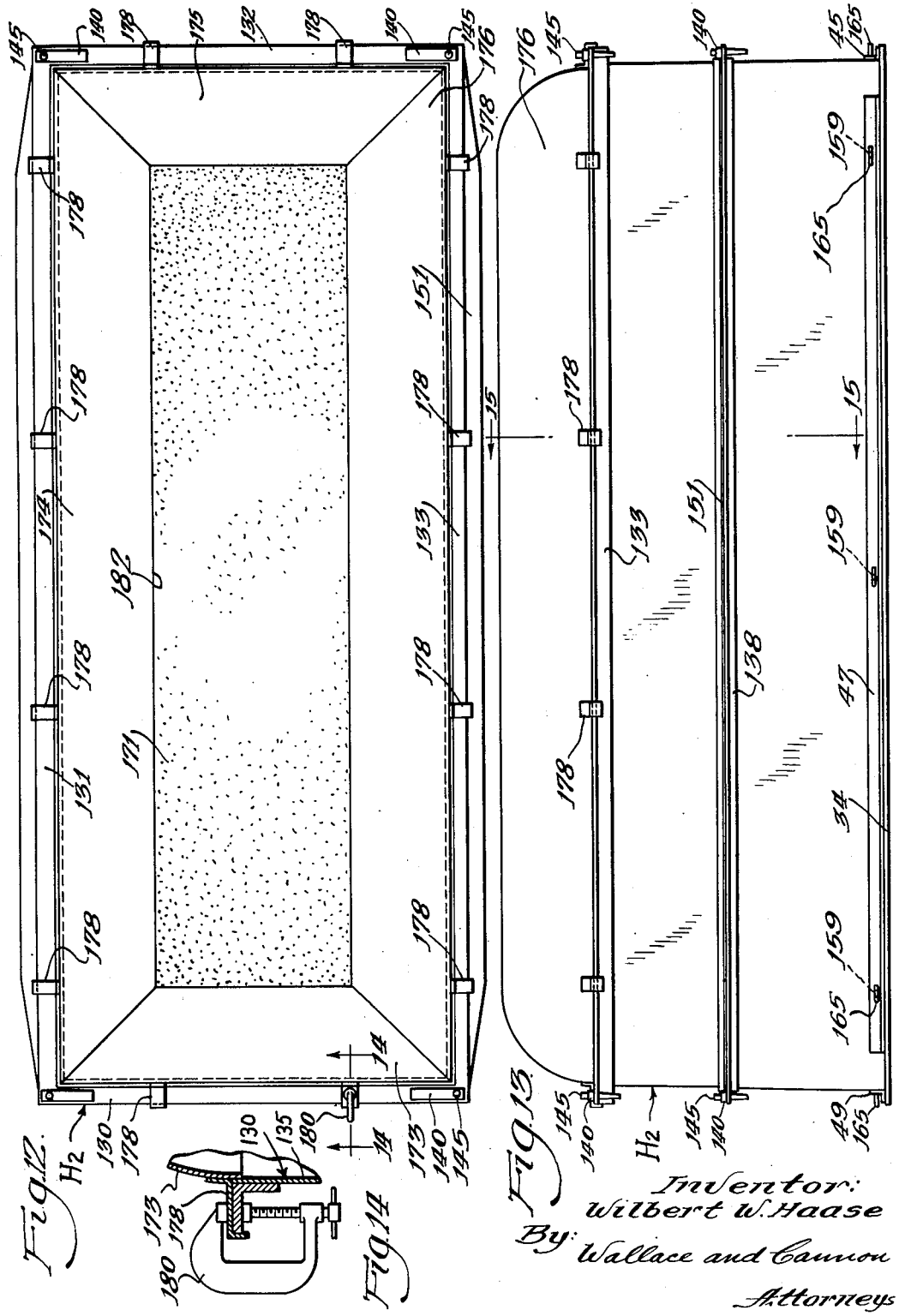

Nov. 4, 1952 W. W. HAASE 2,616,146
BURIAL VAULT FORM
Filed Nov. 4, 1949 9 Sheets-Sheet 6

Inventor:
Wilbert W. Haase
By: Wallace and Cannon
Attorneys

Nov. 4, 1952 W. W. HAASE 2,616,146
BURIAL VAULT FORM
Filed Nov. 4, 1949 9 Sheets-Sheet 7
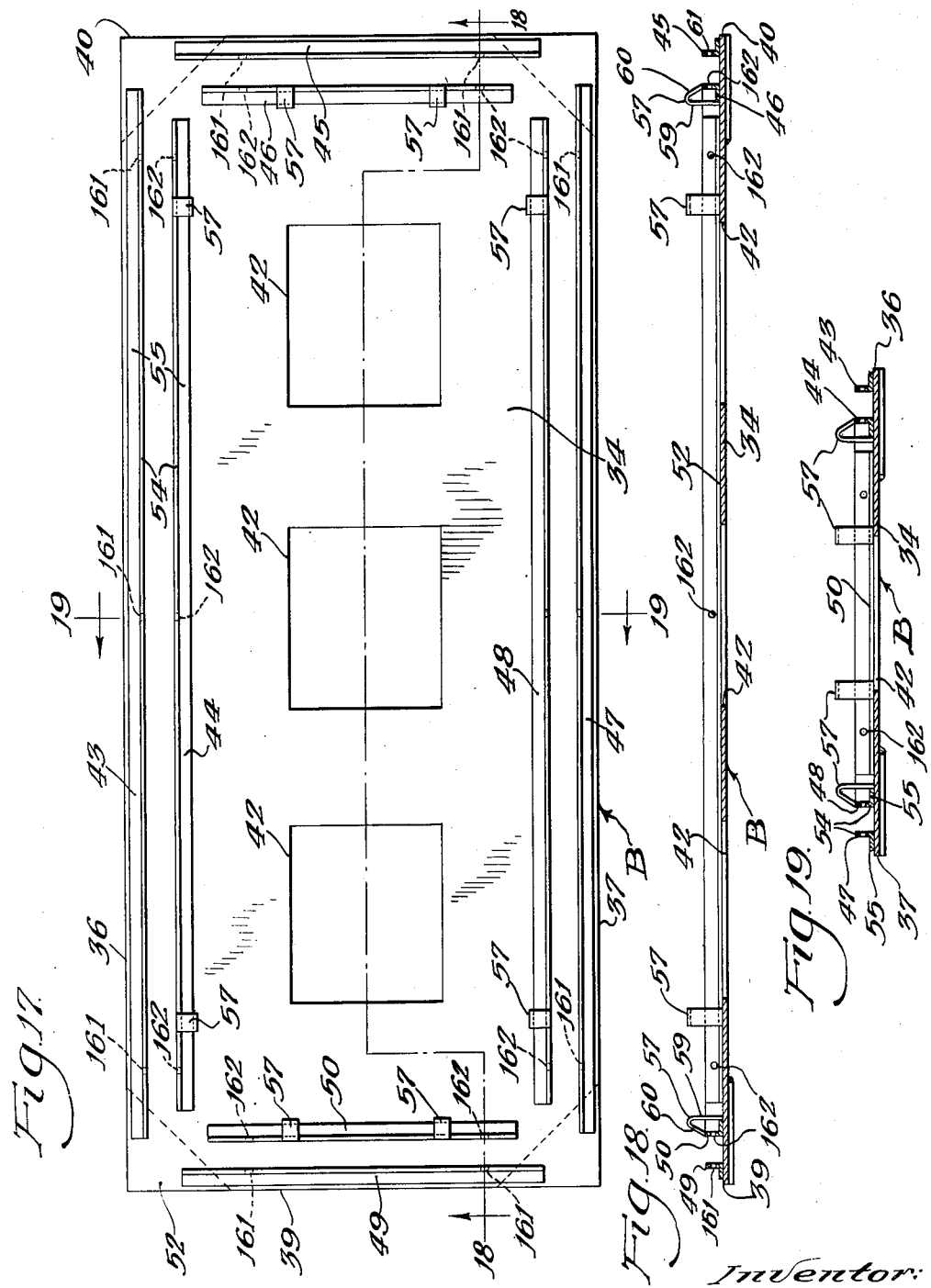
Inventor:
Wilbert W. Haase
By:
Wallace and Cannon
Attorneys Nov. 4, 1952
W. W. HAASE
2,616,146
BURIAL VAULT FORM
Filed Nov. 4, 1949
9 Sheets-Sheet 8
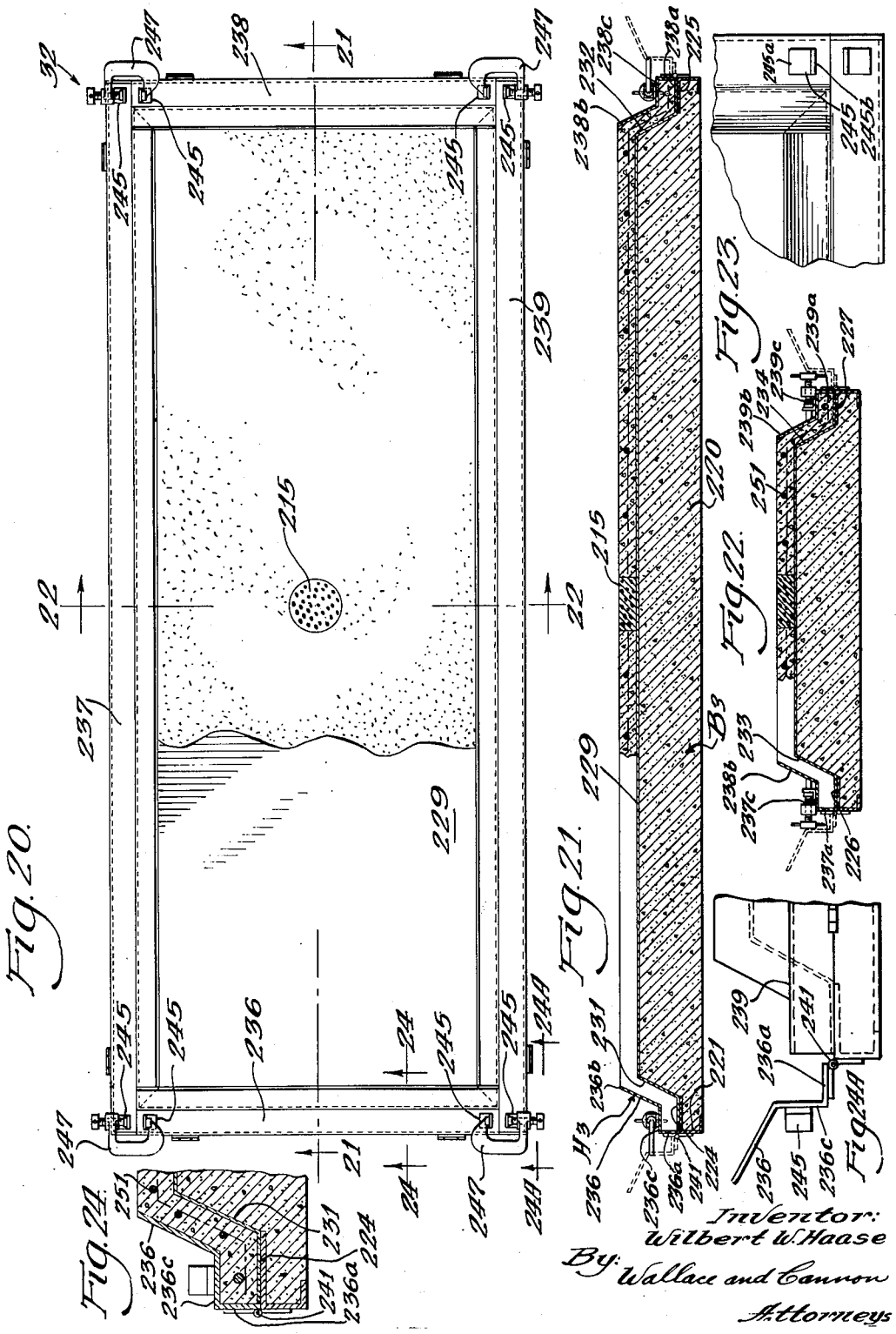
Inventor:
Wilbert W. Haase
By Wallace and Cannon
Attorneys Nov. 4, 1952  W. W. HAASE  2,616,146
BURIAL VAULT FORM
Filed Nov. 4, 1949  9 Sheets-Sheet 9

Inventor:
Wilbert W. Haase
By Wallace and Cannon
Attorneys

Patented Nov. 4, 1952

2,616,146

UNITED STATES PATENT OFFICE 2,616,146

BURIAL VAULT FORM

Wilbert W. Haase, Forest Park, Ill., assignor to Wilbert Manufacturers Association, Forest Park, Ill., a corporation of Illinois Application November 4, 1949, Serial No. 125,545

5 Claims. (Cl. 25—130)

This invention relates to forms and, more particularly, to forms for molding burial vaults and the like.

Various types of forms for molding burial vaults, and the like, have been heretofore known in the art. However, forms heretofore known in the art have had several inherent disadvantages such as, for example, being difficult to assemble and disassemble; being difficult, if not impossible, to accurately adjust to the proper length and breadth; being impractical and inefficient in construction and operation, and the like.

A primary object of my invention is to overcome the aforementioned difficulties and to afford a novel and practical form which is constructed, and operable, in a novel and expeditious manner.

A further object is to provide a novel burial vault form wherein the various parts may be readily assembled and disassembled and wherein the position of the various parts of the form may be readily adjusted relative to each other to insure the affording of a form of the accurate size and shape desired.

Another object is to afford a form of the aforementioned type embodying a novel one-piece core which may be flexed in a novel and expeditious manner to facilitate removal of the core from a finished mold.

Yet another object of my invention is to afford a form of the aforementioned type which is relatively light in weight but is of rugged, durable construction, and can effectively withstand the relatively rough handling to which such devices are normally subjected.

Another object of my invention is to afford a novel form of the aforementioned type embodying a core and side walls and which is constructed in such a manner that various side walls may be quickly and easily associated with the core to afford a practical and efficient form for pouring reinforced concrete burial vaults having an inner liner of asphalt.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 5 is a top plan view of the form shown in Fig. 3, the handle shown in Fig. 3 being removed;

Fig. 6 is a side elevational view of the form shown in Fig. 5;

Fig. 7 is a detail sectional view taken substantially along the line 7—7 in Fig. 6;

Fig. 8 is a detail sectional view taken substantially along the line 8—8 in Fig. 6;

Fig. 9 is a top plan view of the form shown in Fig. 13 with the cover removed;

Fig. 10 is a side elevational view of the form shown in Fig. 9, certain parts being shown broken away;

Fig. 11 is a detail sectional view taken substantially along the line 11—11 in Fig. 9;

Fig. 12 is a top plan view of the form shown in Fig. 9, with the form shown as completely assembled;

Fig. 13 is a side elevational view of the form shown in Fig. 12;

Fig. 14 is a detail sectional view taken substantially along the line 14—14 in Fig. 12;

Figure 3:
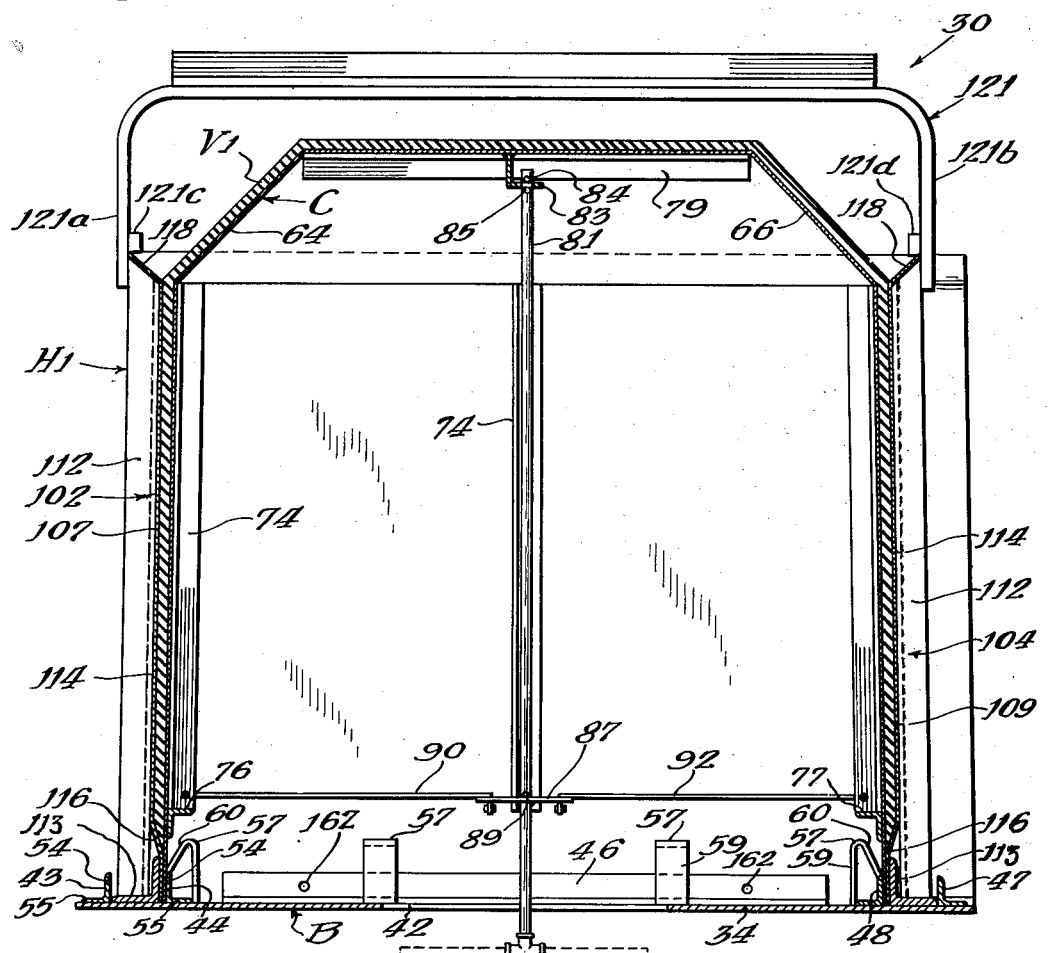
Fig. 3 is a sectional view taken substantially along the line 3—3 in Fig. 6.
Figure 25:
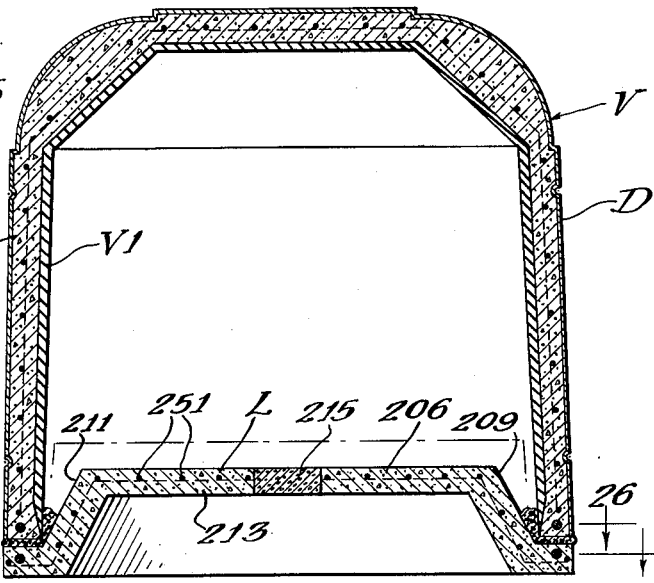
Figure 26:
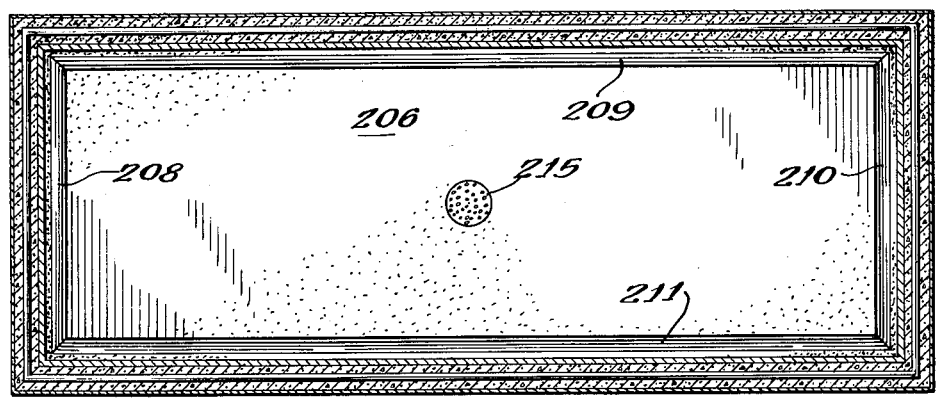
Figure 27:
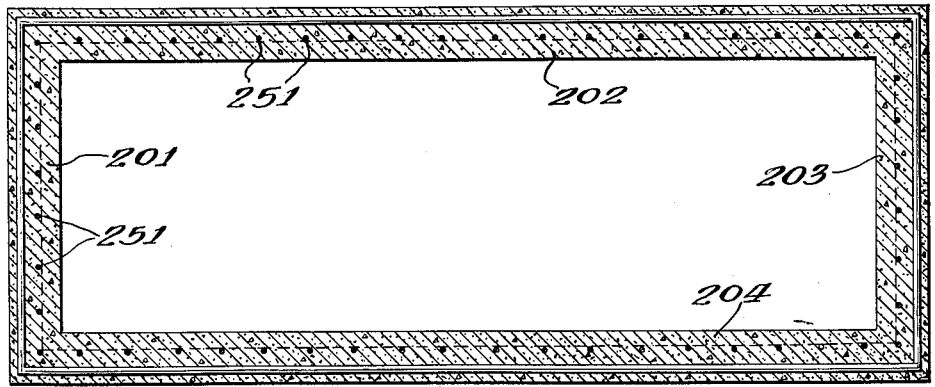

Fig. 17 in a top plan view of the base of the form shown in Fig. 3;

Fig. 18 is a sectional view taken substantially along the line 18—18 in Fig. 17;

Fig. 19 is a sectional view taken substantially along the line 19—19 in Fig. 17;

Fig. 20 is a top plan view of a form for making the base of a burial vault;

Fig. 21 is a sectional view taken substantially along the line 21—21 in Fig. 20;

Fig. 22 is a sectional view taken substantially along the line 22—22 in Fig. 20;

Fig. 23 is a detail top plane view of a portion of the form shown in Fig. 20;

Fig. 24 is a detail sectional view taken substantially along the line 24—24 in Fig. 20;

Fig. 24A is a detail elevational view looking substantially in the direction of the arrows 24A—24A;

Fig. 25 is a transverse sectional view of a burial vault made in a form constructed in accordance with my invention;

Fig. 26 is a sectional view taken substantially along the line 26—26 in Fig. 25; and Fig. 27 is a sectional view taken substantially along the line 27—27 in Fig. 25.

For the purpose of illustrating a preferred embodiment of my invention, a form 30 is shown in Figs. 1 to 19, inclusive, of the type adapted to mold the dome D of an air seal burial vault such as the vault V shown in Fig. 25 of the drawing; and a form 32 is shown in Figs. 20-24, inclusive, for molding the base L of such an air seal burial vault V.

In general, the form 30 comprises an inner housing or core C mounted on a supporting member or base B, and two housings H1 and H2, Figs. 3 and 15, adapted to be interchangeably mounted on the base B over the core C to thereby afford means for forming the inner layer V1 and the outer layer V2 of the dome D of the vault V, Fig. 25, as will be discussed in greater detail hereinafter.

In general, during the operation of the form 30, the core C is mounted in operative position on the base B and the housing H1 is mounted on the base B outwardly of the core C and in spaced parallel relation thereto, and the inner layer V1 is then poured over the core C and into the space between the core C and the housing H1. After this inner layer has suitably hardened, the outer housing H1 is replaced by the outer housing H2 and the outer layer V2 of the burial vault V is then formed on the inner layer V1 between the housing H1 and the core C. After the outer layer V2 has suitably hardened the dome D may then be raised off from the core C, removal of the core C from the dome D being facilitated by novel means embodied in my invention, as will be discussed in greater detail presently. During this operation of raising the dome D the outer housing H2 is allowed to remain in position on the outer layer V2 to facilitate gripping the assembly.

The base B, Figs. 3, 17, 18 and 19, comprises a base sheet 34 made of any suitable material such as, for example, sheet metal, which is substantially rectangular in shape, having two longitudinal edges 36 and 37 and two end edges 39 and 40, Fig. 18. To lighten the base sheet 34, openings such as the openings 42, Fig. 17, may be afforded therein.

Four pairs of elongated retaining members or braces 43 and 44, 45 and 46, 47 and 48, and 49 and 50, respectively, are mounted on the top surface 52 of the base sheet 34 with each of the pairs of bracing members 43-50 disposed in parallel relation to the corresponding edge 36, 37, 38 or 39 of the base plate 34.

Thus it will be seen that the braces 43 and 44 are disposed in parallel relation to the edge 36 of the base plate 34 with the brace 43 being disposed adjacent to, but inwardly from the edge 36, and the brace 44 being disposed in parallel relation to the brace 43 and inwardly therefrom. The other pairs of braces 45 and 46, 47 and 48, and 49 and 50, are similarly disposed with relation to the edges 40, 37 and 39, respectively, of the base sheet 34, the braces 45, 47 and 49 being the outwardly disposed braces of the respective pairs, and the braces 46, 48 and 50 being the inwardly disposed braces thereof.

The braces 43-50 may be made of any suitable material, but I prefer to make them of angle iron, each having an upwardly projecting leg 54, and a horizontally disposed leg 55, the latter leg 55 being mounted on the top surface 52 of the base plate 34 and being secured thereto by any suitable means such as welding. As is best seen in Figs. 3, 17, 18 and 19, the vertically extending legs 54 of the outer bracing members 43, 45, 47 and 49 project upwardly from that edge portion of the horizontal leg 55 thereof which is furthest disposed from the corresponding longitudinal edges 36, 40, 37 and 39, respectively, of the base plate 34; and the vertical leg 54 of the inner braces 44, 46, 48 and 50 projects upwardly from that edge portion of the horizontal leg 55 thereof which is disposed closest to the corresponding edges 36, 40, 37 and 39 of the base plate 34.

Guide members 57 are mounted on the top surface 52 of the base plate 34, in spaced relation to each other along the inner braces 44, 46, 48 and 50, Figs. 3 and 17. Each of the guide members 57 comprises a substantially vertical leg 59 and a downwardly and outwardly sloping leg 60, Figs. 3 and 18, the vertical leg 59 being secured to the upper surface 52 of the base plate 34 in substantially vertical position adjacent to the inside edge of one of the braces 44, 46, 48 or 50, and the leg 60 sloping downwardly and outwardly from the leg 59 into engagement with the upper edge of the vertical flange 54 on the aforementioned corresponding brace 44, 46, 48 or 50 to thereby afford means for guiding the core C down into operative position around the inner braces 44, 46, 48 and 50, as will be discussed in greater detail hereinafter.

Figures 1, 2:
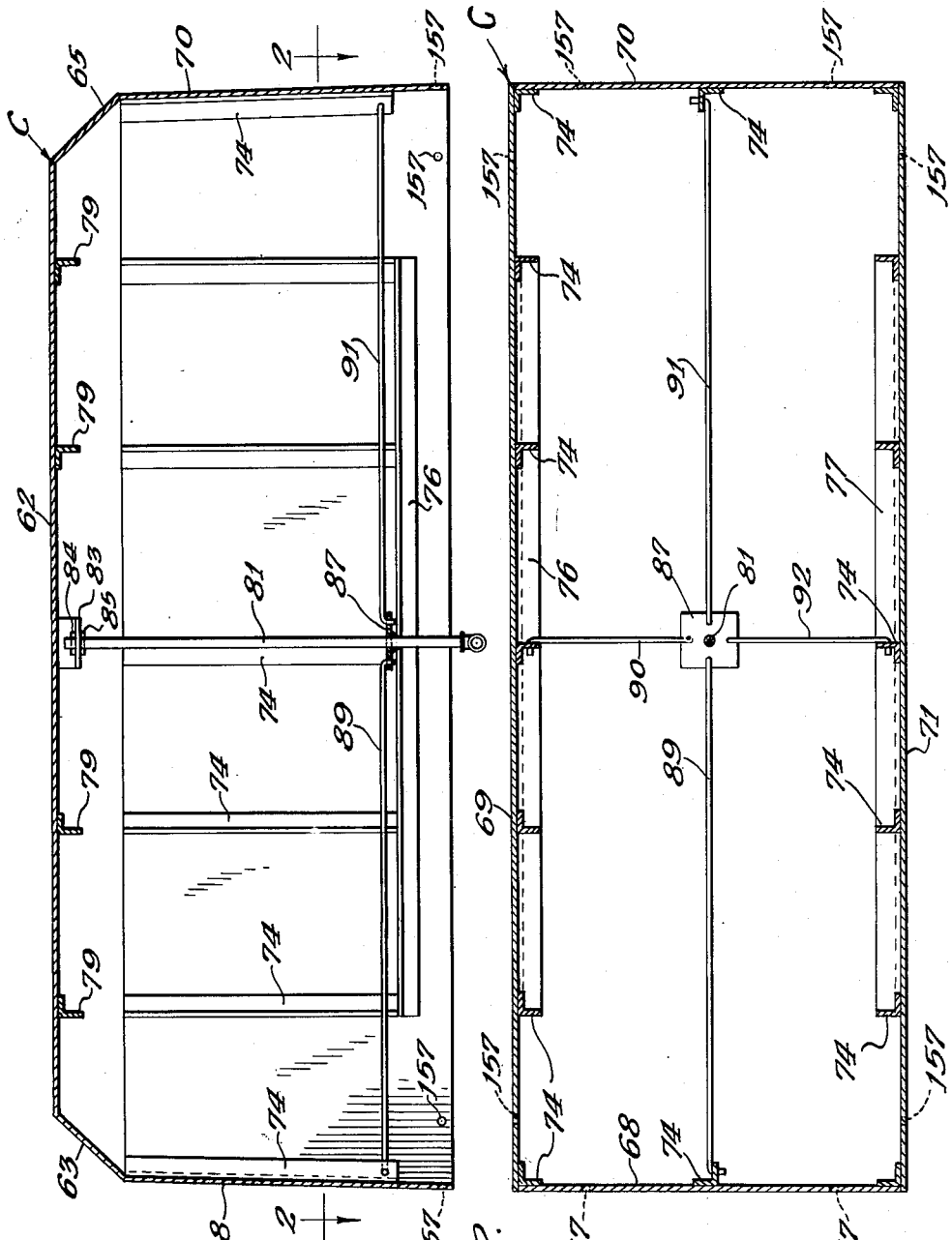
Fig. 1 is a longitudinal sectional view through the core of a form illustrating the preferred embodiment of my invention.
Fig. 2 is a sectional view taken substantially along the line 2—2 in Fig. 1.

The core C, Figs. 1, 2 and 3, comprises a top 62 connected by downwardly and outwardly sloping walls 63, 64, 65 and 66, Fig. 5, to substantially vertically disposed side walls 68, 69, 70 and 71, respectively, Figs. 1 and 2. The top wall 62, the sloping walls 63-66, and the side walls 68-71, of the core C are made of a suitable resilient, flexible material such as, for example, sheet steel, and are preferably integral with each other, the core C being preferably formed by suitable means such as, for example, die-stamping, or in any other suitable manner. Thus it will be seen that the core C comprises an open-bottomed housing having relatively flexible and resilient side walls and top.

Suitable reinforcing members such as, for example, angle irons 74, may be attached to the inner face of the side walls 68-71, in vertically extending position thereon, by suitable means such as welding, and the reinforcing members 74 mounted on the side walls 69 and 71 of the core C abut and extend upwardly from horizontally disposed reinforcing members 76 and 77 welded to the lower edge portion of the inner face of the side walls 69 and 71, respectively. Similar reinforcing members 79 are welded to the inner face of the top 62 of the core C and are preferably disposed in spaced parallel relation to each other along the top 62 transversely to the side walls 69 and 71. It will be seen that although the members 74, 76, 77 and 79 afford reinforcing for the side walls 68-71 and the top wall 62 of the core C, and protect these walls from deforming, they are so constituted and arranged that, if desired, the walls may be flexed inwardly and outwardly, as will be presently discussed.

A rod 81, Figs. 1, 2 and 3, is rotatably mounted in a bracket 83 welded to and depending from the center portion of the top 62 of the core C, suitable means such as pins 84 and 85 extending through the rod 81 to retain the rod 81 in position in the bracket 83. The rod 81 depends from the bracket 83 and projects downwardly below the open end of the core C, the openings 42 in the base B of the form 30 affording means through which the rod 81 may project when the core C is mounted in operative position on the base B. A plate 87 is mounted on the lower end portion of the rod 81 by suitable means such as welding, and projects radially outwardly therefrom. Four links 89, 90, 91 and 92, each have one end portion connected to the plate 87 and the other end portions of the links 89–92 are connected to the center one of the reinforcing members 74 on a corresponding one of the side walls 68, 69, 70 and 71, respectively, of the core C. It will be seen that upon rotation of the rod 81 in the bracket 83, the plate 87 is rotated therewith and the links 89–92 are pulled and pushed by the plate 87 toward and away from the side walls 68–71 of the core C, respectively, and, the side walls 68–71 being flexible, the links 89–92 are, therefore, effective to flex the side walls 68–71 inwardly and outwardly. Suitable means such as a T-fitting 94 may be mounted on the lower end of the rod 81 through which a handle 95 may be inserted to rotate the rod 81 for the purpose of flexing the side walls 68–71 of the core C inwardly and outwardly, to facilitate breaking away of the inner layer V1 of the dome D from the core C, as previously mentioned.

In mounting the core C in operative position on the base B, the core C may be lowered over the inner retaining members 44, 46, 48 and 50, the guide members 57 affording means for guiding the core C into proper position onto the base B wherein the walls 68–71 of the core C are disposed in relatively close-fitting engagement with the outer face of the vertical flanges 54 of the inner retaining members 44, 46, 48 and 50, as shown in Fig. 3.

The housing H1, Figs. 3, 5 and 6, comprises two end walls 101 and 103, and two side walls 102 and 104, which include panels 106, 108, 107, and 109, respectively, Fig. 5, which may be made of any suitable material such as, for example, sheet metal. Suitable reinforcing members such as, for example, angle irons 112 are mounted in vertical position on the outer faces of the panels 106, 108, 107 and 109 to thereby reinforce and strengthen the end walls 101 and 103 and the side walls 102 and 104. As is best seen in Figs. 5 and 6, the reinforcing members 112 are disposed in substantially parallel spaced relation to each other along the end walls 101 and 103 and the side walls 102 and 104, and each of the walls 101–104 has a reinforcing member 112 disposed relatively closely adjacent to each end portion thereof, and another reinforcing member such as the angle iron 113 mounted on the lower edge portion thereof and extending therealong, Fig. 3.

The panels 106–109 of the walls 101–104, each comprises a substantially flat intermediate portion 114 from which the lower edge portion 116 of the panel is offset inwardly, and from which the upper edge portion 118 of the panel slants upwardly and outwardly, Fig. 3.

In assembling the housing H1, after the core C is mounted on the base B, the side walls 101–104 of the housing H1 are mounted on their lower edges on the base B between the pairs of retaining members 49, 43, 45, and 47, and the corresponding walls 68–71, respectively, of the core C, the reinforcing members 113 on the walls 101–104 engaging the outer retaining members 49, 43, 45 and 47, respectively, to thereby press and hold the lower edge portions of the walls 101–104 inwardly in relatively tight fitting engagement with the outer lower edge portions of the walls 68–71, respectively, of the core C and to hold said edge portions of the core in engagement with the inner retaining members 44, 46, 48 and 50 respectively. One end edge 101a, 102a, 103a and 104a of the side walls 101–104, respectively, is complementary in shape to the adjacent inner face of the walls 104, 101, 102 and 103, respectively, against which that edge abuts when the side walls 101–104 are disposed in upright position to afford the housing H1, as will be presently explained.

As is best seen in Fig. 5, each of the side walls 101–104 is somewhat longer than the space between the two adjacent walls when the housing H1 is assembled. That is, when the walls 101–104 are disposed in upright position to afford the housing H1, the end 103a of the wall 103, Fig. 5, abuts the inner face of the wall 102, and the outer end 103b projects outwardly past the wall 104; the end 104a of the wall 104 abuts the inner face of the wall 103, and the other end 104b of the wall 104 extends outwardly past the wall 101; the end 101a of the wall 101 abuts the inner face of the wall 104, and the other end 101b of the wall 101 extends outwardly past the wall 102; and the end 102a of the wall 102 abuts the inner face of the wall 101, and the other end 102b of the wall 102 extends outwardly past the wall 103. With this construction, it will be seen that during the assembly of the housing H1 wherein it is normally desired that the walls 101–104 be disposed in substantially vertical position, with the side walls 102 and 104 and the end walls 101 and 103 affording a substantially rectangular-shaped housing, the ends 101a, 102a, 103a and 104a of the walls 101–104 may readily be shifted along the inner faces of the walls 104, 101, 102 and 103, respectively, to the proper position. This, it will be seen, affords a flexibility to the housing H1 of the form 30 and permits the workman in assembling the form 30 to readily adjust the position of the walls 101–104 relative to each other to afford the proper shape and position of the housing H1 and so as to accommodate or fit the parts to forms of various sizes.

Securing of the side walls 101–104 in upright housing-forming position, may be readily accomplished by suitable means such as C-clamps 120 which may be disposed with one jaw in engagement with the reinforcing flange 112 on each of the walls 101–104 which is adjacent to the end 101a, 102a, 103a and 104a, respectively, and the other jaw of the C-clamps 120 in engagement with the reinforcing member 112 adjacent to the outwardly projecting end portion 104b, 101b, 102b and 103b of the side walls 104, 101, 102 and 103, respectively, against which the ends 101a–104a, respectively, abut. A plurality of such C-clamps 120 may be used at each corner of the housing H1 to thereby insure that the side walls 101–104 will be secured together in a relatively rigid manner.

Figure 4:
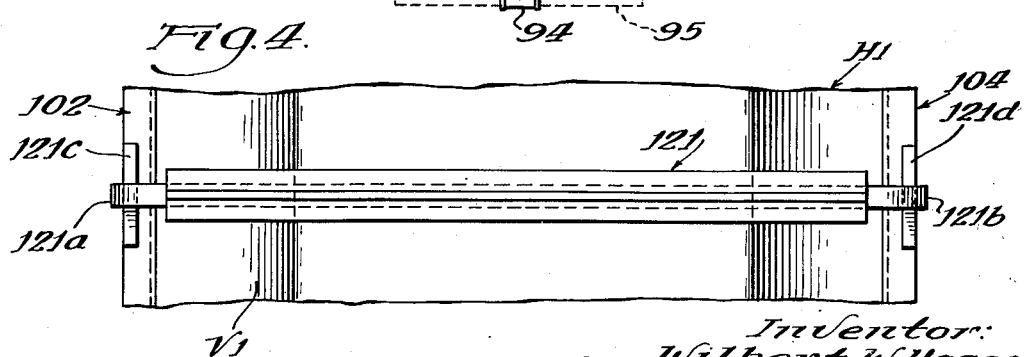
Fig. 4 is a detail top plan view of a portion of the form shown in Fig. 3.

If desired, a substantially U-shaped brace 121, Figs. 3 and 4, having two legs 121a and 121b, from which two flanges 121c and 121d project inwardly, may be mounted on the central upper edge portion of the side walls 102 and 104 with the flanges 121c and 121d on the handle 121 resting on the upper edge of the walls 102 and 104, respectively, and the lower end portions of the legs 121a and 121b disposed in overlying engagement with the outer faces of the upper edge portions of the side walls 102 and 104 to thereby afford additional means for holding the side walls 102 and 104 in parallel position.

When the housing H1 is so disposed on the base B, the intermediate portions 114 of the walls 101–104 of the housing H1 are disposed in substantially parallel spaced relation to the adjacent faces of the walls 68–71 of the core C, and the upper edge portions 118 of the walls 101–104 slope upwardly and outwardly away from the walls 68–71 of the core C. Thus, it will be seen, that with the housing H1 disposed in this position around the core C, burial vault forming material may be readily poured downwardly over the top of the core C from which it will flow down through the spaces afforded between the walls 101–104 of the housing H1 and the walls 68–71, respectively, of the core C. The lower edge portion of the walls 101–104, Fig. 3, of the housing H1 are so shaped that the lower edge portions thereof are disposed in substantially parallel relation to the intermediate portions 114 of the walls 101–104, and the upper edge portions of the lower edge portions of the walls 101–104 slope inwardly from the intermediate portions 114 toward the core C to thereby afford an inwardly sloping bottom for the spaces between the walls 101–104 and the walls 68–71 so that the molding material poured into the spaces between the housing H1 and the core C is narrowed substantially to a point at the bottom of the spaces between the housing H1 and the core C.

Normally, in using my novel form 30, the molding material poured over the core C into the space between the core C and the housing H1 is a suitable sealing material such as, for example, asphalt, as is disclosed in my co-pending application for United States Letters Patent, Serial No. 84,230, filed March 29, 1949, the asphalt being poured in liquid form onto the top 62 of the core C and permitted to flow down the sloping walls 63–66 of the core C into the spaces between the side walls 68–71 of the core C and the side walls 101–104 of the housing H1. When the spaces between the walls 68–71 and the walls 101–104 are completely filled, the operator continues to apply asphalt to the top 62 of the core C and the intermediate portions 63–66, and may manually smooth this latter asphaltic material onto the top 62 and the intermediate portions 63–66 to afford a layer of asphalt having the same thickness or cross section as that between the side walls 68–71 and the walls 101–104. In this manner, it will be seen, that an open-bottomed mold is formed, corresponding in shape to that of the core C, and having walls of substantially uniform cross-section except at the bottom wherein the side walls of the mold V1 taper down substantially to a thin line or point.

After the mold V1 has hardened sufficiently the clamps 120 may be removed from engagement with the walls 101–104, and the walls 101–104 of the housing H may then be removed.

After the housing H1 of the core C has been so removed, the housing H2 may be mounted on the base B in preparation for pouring concrete around the inner layer V1 to thereby form the outer layer V2 of the mold to be formed in the form 30, as will presently be discussed.

The housing H2, Figs. 9–15, comprises four walls 130, 131, 132 and 133, respectively, Fig. 9, the walls 130 and 132 being parallelly disposed end walls and the walls 130–133 being parallelly disposed side walls, and the walls 130–133 being secured together in substantially upright position to afford a substantially rectangular housing H2, as will be discussed in greater detail hereinafter.

Figure 15:
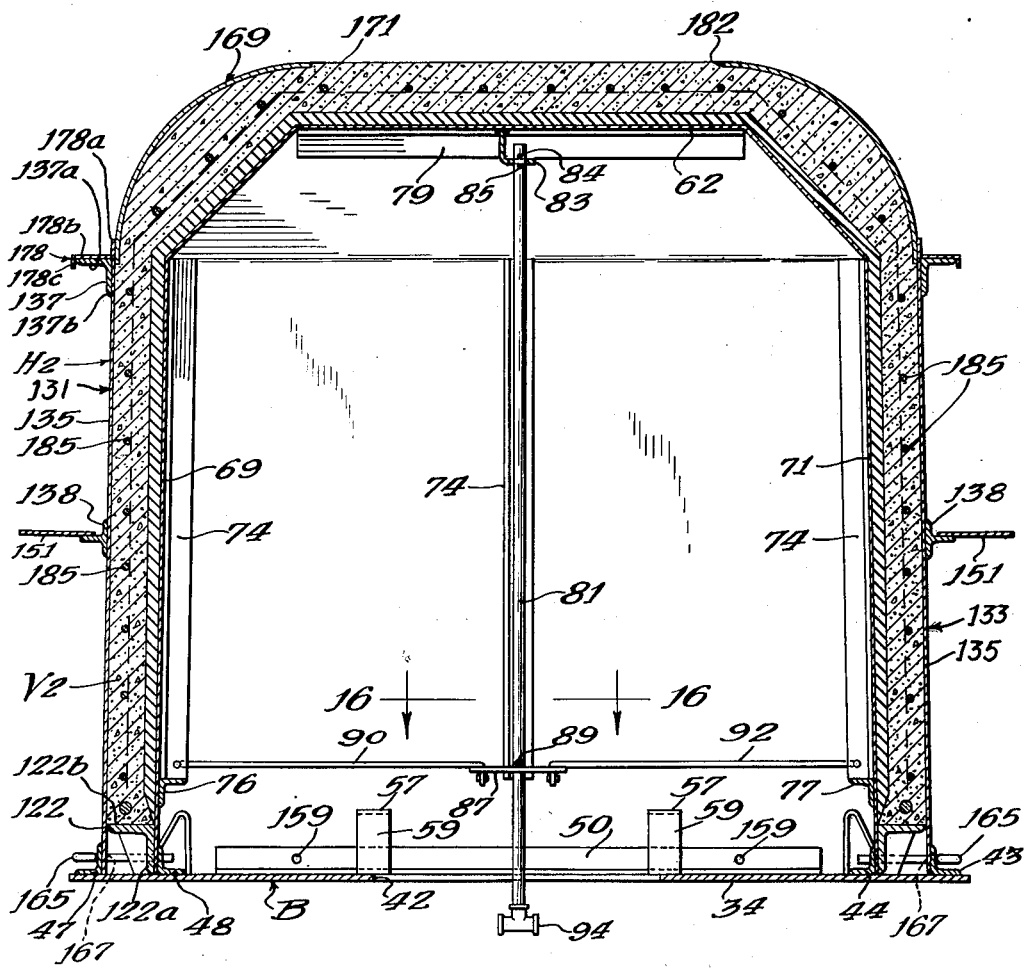
Fig. 15 is a detail sectional view taken substantially along the line 15—15 in Fig. 13.
Figure 16:
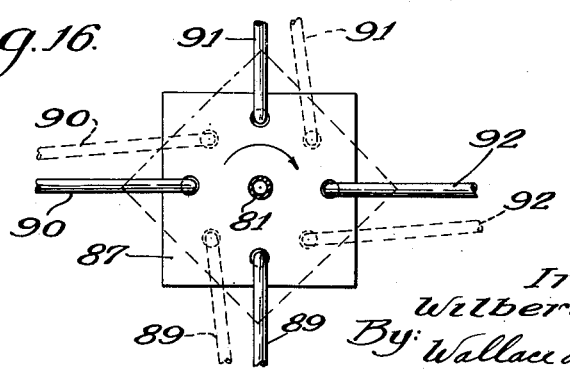
Fig. 16 is a detail sectional view taken substantially along the line 16—16 in Fig. 15.

Each of the walls 130–133 of the housing H2 comprises a substantially rectangular-shaped panel 135, Fig. 15, having an elongated angle bracket 137 mounted along the upper edge portion thereof, the angle bracket 137 having one flange 137a disposed in substantially horizontal position, and the other flange 137b projecting downwardly therefrom and attached to the outer face of the panels 135 by suitable means such as welding. Also, as is best seen in Figs. 10 and 15, each of the walls 130–133 has another elongated reinforcing bracket 138 mounted on the outer face of the intermediate portion thereof and extending longitudinally therealong.

The brackets 137 and 138 on the side walls 131 and 133 extend beyond the opposite end portions of the side walls 131 and 133, respectively, and, when the walls 130, 131, 132 and 133 are disposed in position to define the housing H2, the outwardly projecting portions of the reinforcing brackets 137 and 138 on the side walls 131 and 133 abut the ends of the brackets 137 and 138 on the end walls 130 and 132 which terminate in flush relation to the edges of the end walls 130 and 132, Fig. 9. Extensions or straps 140, Figs. 9 and 11 are mounted on the top surface of the opposite end portions of the brackets 137 on the end walls 130 and 132 in such position that when the side walls 131 and 133 are disposed in the aforesaid position wherein the brackets 137 thereon are disposed in abutting relation to the brackets 137 on the end walls 130 and 132, the straps 140 are disposed in overlying relation to the brackets 137 on the side walls 131 and 133. Openings 142 and 143, Fig. 11, are formed in the outwardly projecting portions of the straps 140 on the end walls 130 and 132, and the underlying portions of the brackets 137 on the side walls 131 and 133, respectively, whereby pins 145 may be inserted through the openings 142 and 143 to thereby releasably secure the walls 130 and 133 to each other in upright position.

Straps 147 which are similar to the straps 140 are similarly mounted on the reinforcing brackets 138 on the end walls 130 and 132 and are adapted to overlie outwardly projecting portions of the brackets 138 on the side walls 131 and 133 when the walls 130 and 133 are disposed in the aforementioned assembled position, and thereby afford means through which pins 149 may be inserted through the straps 147 and the underlying portions of the brackets 138 on the side walls 131 and 133, to thereby secure the brackets 138 on the walls 130–133 together in the same manner that the brackets 137 are so secured.

A reinforcing plate 151, Figs. 9 and 10, may be mounted on the upper surface of the brackets 138 on the side walls 131 and 133 to thereby afford additional reinforcement for the relatively long span of the side walls 131 and 133. It will be appreciated by those skilled in the art that by so doing the panel 135 of the side walls 131 and 133 may be formed of relatively light material such as, for example, sheet steel, and the brackets 137 and 138 may also be made of relatively light material, the plates 151, which may likewise be made of relatively light material such as, for example, sheet steel, being of such width that they afford relatively great reinforcing strength to the side walls 131 and 133 against transverse bending or deforming of these latter walls.

In assembling the walls 130–133 of the housing H2, the walls 130–133 are disposed in upright position, Fig. 15, on the base B between the respective pairs of retaining members 49 and 50, 43 and 44, 45 and 46, and 47 and 48, Figs. 15 and 17, and outwardly of the walls 68–71 of the core C. Suitable blocks, such as angle irons 122, Fig. 15, are inserted into position between the walls 130–133 of the housing H2 and the walls 68–71, respectively, of the core C, prior to the assembly of the walls 130–133 of the housing H2, and, when so disposed, the blocks 122 wedge or press the walls 130–133 of the housing H2 outwardly against the outer retaining members 49, 43, 45 and 47, respectively, and the walls 68–71 of the core C against the inner retaining member 50, 44, 46 and 48, respectively. When the blocks 122 are so disposed the free edge portion of the one leg 122a thereof is disposed on the upper face of the plate 34 of the base B, and the other leg 122b of the blocks 122 is disposed in substantially horizontal position on top of the leg 122a, adjacent to and just below the lower edge portion of the inner layer V1 of the mold previously formed on the core C. Thus, it will be seen that the leg 122b of the block 122 affords an effective bottom for the spaces between the walls 130–133 and the walls 68–71 substantially in alignment with the lower edge portion of the inner lining V1 formed on the core C.

As is best seen in Figs. 2, 13, 15 and 17, a plurality of openings 157 are disposed in spaced relation to each other along the lower edge portions of the side walls 68–71 of the core C, Fig. 2; a plurality of similarly spaced openings 159, Figs. 13 and 15, extend through the lower edge portion of the walls 130–133 of the housing H2; and, similarly, correspondingly positioned openings 161 and 162 are formed in the outer retaining strips 43, 45, 47 and 49, and the inner retaining strips 44, 46, 48 and 50, respectively, Fig. 17. When the housing H2, the core C, and the base B, are disposed in the aforementioned assembled relation to each other, corresponding openings 159, 157, 161 and 162, respectively, are disposed in alignment with each other whereby suitable retaining members such as pins 165, Figs. 15, 10, 13, may be inserted therethrough and through openings in the parts 122 and 122a to positively hold the housing H2, the core C, and the base B in such assembled position.

The side walls 101–104 of the housing H1 may having openings 167, Figs. 3 and 8, formed in the lower edge portions thereof in positions similar to those of the openings 159 in the side walls 130–133 of the housing H2, whereby, if desired, the pins 165 may be inserted through the openings 167 in the housing H1, and the openings 157 and 161 and 162, in the core C, the outer retaining members 43, 45, 47 and 49, and the inner retaining members 44, 46, 48 and 50, respectively, when the housing H1, the core C and the base B are disposed in the assembled position relative to each other, as previously discussed.

After the walls 130–133 of the housing H2 have been disposed in the aforementioned upright position on the base B, and have been releasably connected together by the pins 145 and 149, as previously discussed, a cover 169 comprising a top 171, and downwardly curved walls 173, 174, 175 and 176 may be mounted on the upper edge portion of the walls 130–133 of the housing H2. The cover 169 is substantially complementary in shape to the upper periphery of the housing H2 defined by the upper edge portions of the walls 130–133, the walls 173, 174, 175 and 176 of the cover 169 corresponding to the walls 130, 131, 132 and 133, respectively, of the body of the housing H2.

A plurality of substantially Z-shaped brackets 178, Figs. 12 and 15, are disposed on the lower edge portions of the side walls 173–176 of the cover 169 in spaced relation to each other. Each of the brackets 178 comprises an end leg 178a welded to the outer face of the lower edge portion of the corresponding walls 173–176 in parallel relation thereto; an intermediate leg 178b, projecting horizontally outwardly from the leg 178a in substantially parallel relation to the leg 137a of the underlying bracket 137; and an outwardly disposed or free leg portion 178c projecting downwardly from the outer edge portion of the intermediate portion 178b to thereby afford an overhanging lip on the brackets 178 which may be disposed outwardly of the outer edge portion of the brackets 137 in relatively close-fitting engagement therewith to thereby restrain the cover 169 from movement transversely to the walls 130–133 when the cover 169 is mounted in operative position thereon. Securing of the cover 169 against vertical movement relative to the walls 130–133 of the housing H2 may be accomplished by suitable means such as C-clamps 180, Fig. 12, mounted on and engageable with the individual brackets 178, and the underlying brackets 137. For the purpose of illustrating my invention, only one C-clamp 180 is shown in Fig. 12 of the drawings. However, it will be understood this is only to simplify the drawing herein, and that in normal operation, a separate C-clamp may be used on each of the brackets 178 to thereby releasably secure each bracket to the underlying bracket 137.

The top 171 of the cover 169, Figs. 12 and 15, has a substantially rectangular-shaped opening 182, and it will be seen that the walls 173–176 and the top 171 of the cover 169 are disposed in upwardly and outwardly spaced relation to the intermediate walls 63–66, and the top wall 62 of the core C when the cover 169 is disposed in operative position on the upper edge of the walls 130–133 of the housing H2. With the walls 171, and 173–176 of the cover 169 so disposed relative to the corresponding walls 62, and 68–71 of the core C, molding material may be poured or otherwise fed into the opening 182 and permitted to flow downwardly across the inner lining V1 previously formed on the core C, to completely fill the space between the walls 130–133 of the housing H2 and the walls 68–71 of the core C, above the blocks 122, as well as the space between the cover 169 of the housing H2 and the sloping walls 63–66 and the top wall 62 of the core C.

It will be remembered that the inner layer V1 previously molded between the housing H1 and the core C preferably comprises suitable sealing material such as, for example, asphalt, as is described in greater detail in my aforementioned co-pending application, Serial No. 84,230, filed March 29, 1949. In practice, I prefer to form the outer layer V2 of the vault V of concrete reinforced by suitable means, such as, for example, by reinforcing members 185, Fig. 15, which may be positioned in the space between the core C and the housing H2 during the pouring of the molding material thereinto, as will be understood by those skilled in the art. The reinforcing members 185 which I prefer to use comprise expanded metal sheets, but other suitable types of reinforcing such as, for example, steel rods, and the like, may be used, as will be understood by those skilled in the art, without departing from the purview of my invention.

In forming or molding the outer layer V2 of the vault V in my novel form 30, the space between the core C and the housing H2 may be filled with the molding material such as, for example, the aforementioned concrete, to a position flush with the opening 182 in the cover 169 and the concrete exposed through opening 182 may be smoothed by suitable means such as troweling.

After the poured and troweled concrete, or other molding material, has been permitted to set for a proper length of time, the C-clamps 180 may be removed from the brackets 178 and 137, and the cover 169 may be raised from the walls 130–133 of the housing H2; the pins 165 and the pins 145 and 149 may be removed from their latching engagement with the walls 130–133; and the walls 130 and 133 of the housing H2 may then be removed from the form 30. A suitable grab may then be engaged with the dome D of the vault V, and the layers V2 and V1 raised as a single unit from the core C, the rod 81 being manually rotated by the operation of suitable means such as the handle 95, to thereby cause reciprocation of the links 89–92 and resultant flexing of the walls 68–71 of the core C, as previously discussed, to facilitate breaking away of the inner layer V1 of the dome D from the core C.

Thus it will be seen that my novel form 30 affords a practical and efficient, novel means for forming the dome portion of a burial vault such as the dome D of the vault V, shown in Fig. 25, the form 30 being constructed, and being operable in a novel and expeditious manner not heretofore known in the art.

The vault V for which my novel form 30 is primarily adapted, comprises what is known in the art as an air-seal vault. As is described in greater detail in my aforementioned patent application, Serial No. 84,230, in the use of the vault such as the vault V, a casket may be placed on a suitable base such as the base L, Fig. 25, and the dome D may then be disposed in overlying relation to the casket and sealed to the base L. Thereafter, the entire vault V may be disposed in the interment space, such as, for example, the grave, and it will be seen that not only is the casket protected from contact with water by the seal afforded between the dome D and the base L, but also, inasmuch as the dome D is disposed in inverted position and the upper portion thereof is substantially air-tight, any water which might tend to enter from the bottom of the dome D is resisted by the air pressure created in the dome D by such a rise of water therein. So that the casket disposed in the vault V will be disposed a sufficient distance above the lower edge portion of the dome D that any water tending to enter the dome D may rise therein sufficiently to exert effective restraining pressure thereagainst without damaging the casket, the base L preferably has a raised central portion 206 on which the casket may rest, whereby the casket is disposed above the lower edge portion of the dome D.

In use, the dome D is normally mounted on a base L comprising a substantially rectangular-shaped peripheral edge portion having side walls 201, 202, 202 and 204, Figs. 25 and 27, from which a substantially rectangular-shaped center portion projects upwardly therefrom, Figs. 25 and 26, the center portion comprising a substantially horizontal flat top 206 interconnected to the side walls 201–204 by inwardly and upwardly sloping intermediate walls 208, 209, 210 and 211, respectively.

The lower face 213 of the base L is preferably concave in form, to thereby afford a relatively light but very strong base structure and, also, to afford an open space between the top 206 and the underlying supporting body such as, for example, the ground. A porous block such as, for example, a cinder concrete block 215, which is pervious to the passage of air and moisture therethrough, but is impervious to the passage of vermin therethrough, is mounted in and extends through the central portion of the top 206 of the base L, and affords a "breather" through which air may pass into and out of the dome D from the bottom, as is discussed in greater detail in my aforementioned application, Serial No. 84,230.

The form 32 in which the base L of the vault V may be formed comprises a base B3 having a housing H3 mounted thereon, Figs. 20–24A. The base B3 of the form 32 preferably comprises a relatively heavy block 220 formed of suitable material such as, for example, concrete, and an overlying plate 221, mounted on the upper face thereof. The upper face of the block 220 of the base B3 is substantially rectangular in shape, and comprises a substantially rectangular peripheral edge portion having end edge portions 224 and 225, Fig. 21, and side edge portions 226 and 227, the edge portions 224–227 being disposed in substantially the same horizontal plane. A substantially rectangular-shaped central portion 229 of the top surface of the block 220 is disposed in horizontal position above the side edge portions 224–227 and is connected to the side edge portions 224–227 by intermediate portions 231–234, respectively, which slope upwardly and inwardly from the edge portions 224–227.

The base plate 221 mounted on the block 220 may be made of any suitable material such as, for example, sheet steel, and is disposed in close-fitting overlying relation to the top surface thereof and conforms in shape to the aforementioned top surface of the block 220.

The housing H3 comprises a plurality of walls or hoods 236, 237, 238 and 239, Figs. 20, 21 and 22, hingedly mounted by suitable means such as hinges 241 on the outer edge of the edge portions 224–227 of the block 220. Each of the hoods 236–239, comprises an end portion 236a, 237a, 238a and 239a, respectively, hinged in the aforementioned manner by the hinges 241 to the outer edges of the edge portions 224–227 of the block 220; a free end portion 236b, 237b, 238b and 239b, respectively; and an intermediate portion 236c, 237c, 238c and 239c interconnecting the end portions 236a–239a and the end portions 236b–239b, respectively. The hoods 236–239 are pivotable upon the pins 241 around the respective edges of the edge portions 236–239, respectively, between open and closed positions shown in broken lines and solid lines, respectively, in Figs. 21 and 22. It will be noted that when the hoods 236–239 are disposed in open position, they project outwardly from the outer edges of the edge portions 224–227 of the base block 220. Also, it will be seen that when the hoods 236–239 are disposed in closed position, the legs 236a–239a, thereof, project substantially vertically upwardly from the outer edges of the edge portions 224–227, respectively; the intermediate legs 236c–239c are disposed in overlying substantially parallel relation to the edge portions 224–227; and the other end legs 236b–239b are disposed in outwardly spaced substantially parallel relation to the intermediate walls 231–234 of the base block 220.

As is best seen in Figs. 23, 24 and 24A, the edges of the hoods 236–239 are so formed that when the hoods 236–239 are disposed in closed relation to each other, the edges of each of the hoods 236–239 abut the inner face of corresponding end portions of the adjacent ones of the hoods 236–239 to thereby afford a close-fitting, substantially sealed relation between the hoods 236–239, which is effective to retain molding material, such as concrete, without leakage.

A plurality of brackets 245, Figs. 20, 22 and 23 are disposed on the hoods 236–239, with each of the brackets mounted on one end portion of one of the hoods 236–239. The brackets 245 preferably comprise angle brackets having a substantially horizontally disposed flange 245a connected to the end edge portion of the legs 236a–239a of the hoods 236–239 by suitable means such as welding, and a vertically disposed leg 245b projecting upwardly therefrom. The brackets 245 are disposed on the end portions of the hoods 236–239 in a manner whereby the flanges 245b thereof on adjacent end portions of adjacent hoods 236–239 are disposed in parallel relation to each other and afford means on which fastening members such as, for example, C-clamps 247, may be disposed to hold the hoods 236–239 in the aforementioned closed positions.

In forming a base L of a vault V in my novel form 32, the breather block 215 may be mounted on the central portion of the top 229 of the block 220 and concrete may be poured on the raised central portion 229 of the block 220 and permitted to flow thereover downwardly into the space between the hoods 236–239 and the block 220 and may be leveled across the top 229 of the block 220 by suitable means such as troweling, to the level of the upper edge portion of the hoods 236–239. After the poured concrete has been permitted to harden or set a proper length of time, the clamps 247 may be removed from the hoods 236–239, and the hoods 236–239 may be swung on the respective hinges 231 outwardly into the position shown in dotted lines in Figs. 21 and 22, and the hardened base L may be lifted vertically from the base B3 of the form 32. If desired, as will be understood by those skilled in the art, suitable reinforcing members 251, such as welded rods or expanded metal sheets, may be disposed across the top of the central portion 229 of the base 220 and between the base block 220 and the hoods 236–239 during pouring of the molding material from which the base L of the vault V is to be formed.

From the foregoing it will be seen that I have afforded a novel means whereby the various portions of an air-seal vault, such as the vault V may be readily formed or molded.

Also, it will be seen that I have afforded a form which is constructed and operable in a novel and expeditious manner.

Furthermore, it will be seen that I have afforded a form, the various portions of which may be readily and easily assembled in producing the complete form, and which may be efficiently and economically produced commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a device for molding burial vaults, a substantially rectangular-shaped base, a plurality of pairs of elongated bracing members mounted on said base, each of said pairs of bracing members comprising an outer member and an inner member disposed in substantially parallel relation to each other, and each of said pairs of bracing members being disposed on said base in parallel spaced relation to a respective one side edge of said base with said outer member of that pair disposed adjacent to said respective one side edge, a core comprising an inverted, substantially cup-shaped housing mounted on said base in overlying engagement with said inner members of said pairs of bracing members, an outer housing mounted on said base outwardly of said core, said outer housing comprising side walls mounted on said base between said core and said outer members with predetermined portions of said side walls disposed in spaced, substantially parallel relation to adjacent corresponding portions of said core, and means comprising other elongated bracing members mounted between said outer members and said inner members of said pairs in parallel relation thereto for holding said core and said housing in position on said base, each of said other elongated members engaging with a corresponding one of said outer members and an edge portion of a corresponding one of said side walls to thereby press said corresponding one of said side walls and an adjacent portion of said core toward one of said inner members.

2. In a device for molding burial vaults, a base comprising a substantially rectangular-shaped plate having a top surface and a bottom surface, a plurality of pairs of elongated bracing members mounted on said top surface of said plate, each of said pairs of bracing members comprising an inner bracing member and an outer bracing member disposed in substantially parallel relation to each other and with said outer bracing member being disposed on said top surface in substantially parallel relation to a corresponding edge of said plate, guide means mounted on said plate and projecting upwardly from said inner bracing members in spaced relation to each other, an open-bottomed housing mounted on said base in enclosing relation to said inner bracing members and said guide means to afford a mold core, an outer housing comprising side walls mounted on said base between said open-bottomed housing and said outer members in position to receive mold-forming material between said side walls and said open-bottomed housing, and means, including said bracing members for holding said open-bottomed housing and said side walls on said base.

3. In a device for molding burial vaults, a base comprising a substantially rectangular-shaped plate having a top surface and a bottom surface, a plurality of pairs of elongated bracing members mounted on said top surface of said plate, each of said pairs of bracing members comprising an inner bracing member and an outer bracing member disposed in substantially parallel relation to each other and with said outer bracing member being disposed on said top surface in substantially parallel relation to a corresponding edge of said plate, guide means mounted on said plate and projecting upwardly from said inner bracing members in spaced relation to each other, a core mounted on said base, said core comprising a housing including a top wall and a plurality of side walls, said side walls being disposed in upright position exteriorly of said inner bracing members, an outer housing mounted on said base, said outer housing comprising a plurality of other side walls mounted in upright position on said base between said first mentioned side walls and said outer bracing members, each of said other side walls having portions disposed in substantially parallel spaced relation to a corresponding one of said first mentioned side walls for the reception of mold-forming material therebetween, and means movably mounted on said top of said first housing and connected to said first mentioned side walls for moving portions at least of said first mentioned side walls toward and away from said side walls of said outer housing for assisting in the removal of said core from a mold.

4. In a device for molding burial vaults, a base comprising a substantially rectangular-shaped plate having a top surface and a bottom surface, a plurality of pairs of elongated bracing members mounted on said top surface of said plate, each of said pairs of bracing members comprising an inner bracing member and an outer bracing member disposed in substantially parallel relation to each other and with said outer bracing member being disposed on said top surface in substantially parallel relation to a corresponding edge of said plate, guide means mounted on said plate and projecting upwardly from said inner bracing members in spaced relation to each other, a core mounted on said base, said core comprising a housing including a top wall and a plurality of side walls, said side walls being disposed in upright position exteriorly of said inner bracing members, an outer housing mounted on said base, said outer housing comprising a plurality of other side walls mounted in upright position on said base between said first mentioned side walls and said outer bracing members, each of said other side walls having portions disposed in substantially parallel spaced relation to a corresponding one of said first mentioned side walls for the reception of mold-forming material therebetween, and means for moving portions of said first mentioned side walls toward and away from said side walls of said outer housing to thereby facilitate removal of said core from a mold, said last mentioned means comprising link members mounted on said first mentioned side walls and effective upon operative movement to flex said first mentioned side walls toward and away from side walls of said outer housing, and an actuating member mounted on said top and including a portion projecting outwardly through said base, said actuating member being connected to said link members and being movable by said outwardly projecting portion to thereby operatively move said link members and effect said flexing of said first mentioned side walls.

5. In a device for molding burial vaults, a base comprising a substantially rectangular-shaped plate having a top surface and a bottom surface, a plurality of pairs of elongated bracing members mounted on said top surface of said plate, each of said pairs of bracing members comprising an inner bracing member and an outer bracing member disposed in substantially parallel relation to each other and with said outer bracing member being disposed on said top surface in substantially parallel relation to a corresponding edge of said plate, a core mounted on said base, said core comprising a housing including a top wall and a plurality of side walls, said side walls being disposed in upright position exteriorly of said inner bracing members, guide means mounted on said plate and projecting upwardly from said inner bracing member for guiding said side walls into said position, an outer housing mounted on said base, said outer housing comprising a plurality of side walls mounted in upright position on said base between said first mentioned side walls and said outer bracing members, each of said other side walls having portions disposed in substantially parallel spaced relation to corresponding one of said first mentioned side walls for the reception of mold-forming material therebetween, and means for moving portions of said first mentioned side walls toward and away from said side walls of said outer housing to thereby facilitate removal of said core from a mold, said last named means comprising a rod rotatably mounted on said top wall and depending therefrom, said rod having a lower end portion projecting outwardly from said base, a plurality of links mounted on said rod and connected to said first mentioned side walls, said links being operable upon rotation of said rod relative to said top wall to move portions of at least said first mentioned side walls inwardly and outwardly relative to said side walls of said outer housing, and means comprising said lower end portion of said rod for rotating said rod relative to said top wall.

WILBERT W. HAASE.

REFERENCES CITED

The following references are of record in the file of this patent:

UNITED STATES PATENTS

| Number | Name | Date |
|---|---|---|
| 340,877 | Hassard | Apr. 27, 1886 |
| 859,112 | Roehr | July 2, 1907 |
| 1,047,102 | Meinken | Dec. 12, 1912 |
| 1,363,391 | Carpenter | Dec. 28, 1920 |
| 1,523,082 | Revis | Jan. 13, 1925 |
| 1,692,447 | Janisch | Nov. 20, 1928 |
| 1,897,603 | Brutsche | Feb. 14, 1933 |
| 2,001,795 | Palmer | May 21, 1935 |
| 2,028,443 | Dormer | Jan. 21, 1936 |
| 2,219,106 | Kruckenberg | Oct. 22, 1940 |
| 2,306,548 | Leemhuis | Dec. 29, 1942 |
| 2,524,981 | Le Tourneau | Oct. 10, 1950 |